United States Patent Office 3,459,706
Patented Aug. 5, 1969

3,459,706
LOW VISCOSITY SOLUTIONS OF POLYMERIC PRECURSORS OF IMIDE CONTAINING POLYMERS AND AROMATIC DIACID DIESTERS
Francis E. Schweitzer, Strafford-Wayne, Pa., assignor to E. I. du Pont de Nemours and Company, Wilmington, Del., a corporation of Delaware
No Drawing. Continuation-in-part of application Ser. No. 621,795, Mar. 9, 1967. This application Jan. 11, 1968, Ser. No. 697,015
Int. Cl. C08g 20/32
U.S. Cl. 260—47
10 Claims

ABSTRACT OF THE DISCLOSURE

Low viscosity solutions of (1) polymeric precursors of imide-containing polymers, such precursors being amine terminated and including polyamide-acids, polyamide esters, polyamide-amic acids, and the like, and (2) aromatic diacid diesters; convertible to imide-containing polymers of higher viscosity.

BACKGROUND OF THE INVENTION

This application is a continuation-in-part of my copending application, Ser. No. 621,795, filed Mar. 9, 1967.

Solvent-soluble polymeric precursors of useful imide-containing polymers are known. These precursor materials are convertible, by heat, chemicals or both, to the imide-containing polymers.

The earliest and best known of such precursors are polyamide-acids of the class defined in Edwards, U.S. Patent No. 3,179,614 issued Apr. 20, 1965, Species of such polyamide-acids are described in Lavin, Markhart and Kass, U.S. Patent No. 3,190,856 issued June 22, 1965. Other species are described in Frost and Bower, U.S. Patent No. 3,179,635 issued Apr. 20, 1965, and Loncrini, U.S. Patent No. 3,182,073 issued May 4, 1965. Conversion of polyamide-acids to polyimides is described in Edwards, U.S. Patent No. 3,179,634 issued Apr. 20, 1965.

Other classes of solvent-soluble precursors of the type referred to above are, for example, the polyamide esters described in Sorenson, U.S. patent application Ser. No. 288,535 filed June 17, 1963 and assigned to the same assignee as that of the present invention; the polyamide-amic acids described in Dutch patent application No. 6,400,422 (available July 22, 1964), British patent specification No. 1,032,649 published June 15, 1966, and Lavin, Markhart and Santer, U.S. Patent No. 3,260,691 issued July 12, 1966.

The disclosure of each of the above references is hereby incorporated herein in its entirety.

The above-mentioned soluble precursor polymers are frequently used by applying a solution of the precursor polymer to another material, followed by heating of the applied solution to convert the precursor and remove solvent. In order to obtain a desired high inherent viscosity in the resulting imide-containing polymer, while keeping the amount of solvent present as low as possible to minimize the solvent removal aspect, it has sometimes been necessary to use a precursor solution of higher viscosity than is desired for some situations.

For example, in the application of precursor solutions to fine gage wire in the preparation of insulated wire, high speed coating and converting operations sometimes cause blistering of the coating. Prior to the present invention, a need existed for precursor solutions of lower viscosities, at equal solids content, than the corresponding known precursor solutions, which would, among other useful advantages, permit wire coating at faster speeds without blistering.

SUMMARY OF THE INVENTION

The present invention provides low viscosity, high solids content solutions of materials convertible to imide-containing polymers.

The compositions of the present invention comprise, in a suitable inert organic solvent, two components (A) and (B), as follows:

(A) An amino-terminated linear aromatic polymer, capable of being converted as mentioned above to corresponding imide-containing polymer, said aromatic polymer typically being of any class described in any reference identified above, and having the formula:

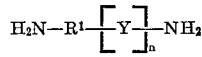

where $R^1$ is a divalent radical containing at least two carbon atoms; Y is a recurring unit based on aromatic moieties derived from an aromatic tri- or tetracarboxylic acid and an organic diamine containing at least two carbon atoms; and where $n$ is a positive whole number sufficient to provide, on the average, for each 100 recurring units of Y, in the range from about 2 to about 60 amino end groups in said polymer, said polymer having an inherent viscosity, as determined at 30° C. in a suitable solvent, e.g. N,N-dimethylacetamide, N,N-dimethylformamide, sulfuric acid, nitric acid, etc., of less than about 0.8; and (B) A monomeric aromatic diacid diester; said diester (B) being present preferably in an amount chemically equivalent to the number of said amino end groups in (A), although a slight excess of diester can be used under some conditions and as much as 40%, 50% or more excess amino groups is satisfactory for some polymers under some conditions.

In use, the (A) and (B) components of the above-described solutions of this invention react to form the corresponding imide-containing polymers having the formula:

(2) 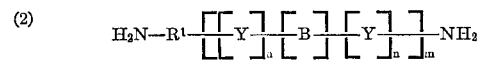

where $R^1$, Y and $n$ have the same meaning as above (the $n$'s can of course be different in this formula); B is an aromatic moiety derived from a monomeric aromatic diacid diester of the formula (3) 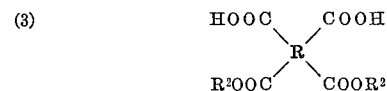

where R is a tetravalent aromatic radical containing at least six carbon atoms, no more than two carbonyl groups of said diacid diester being attached to any one carbon atom of R; $R^2$ is alkyl, aryl or aralkyl and preferably is alkyl of less than 5 carbon atoms; and $m$ is a number sufficient to provide an imide-containing polymer having an inherent viscosity greater than that of its precursor polymer of Formula 1 above.

By way of explanation, it will be understood that the solutions of this invention have lower viscosities at equal solids content than solutions of the corresponding aromatic precursor alone (i.e. without the monomeric aromatic diacid diester) and can be used to coat wire at faster speeds without blistering. The result is imide-containing coatings having flexibilities substantially equal to coatings derived from essentially stoichiometro precursors and superior to coatings derived from the precursor of Formula 1 above alone and lacking the diacid diester.

Thus, it has been found possible by practice of the present invention, exemplified below, to prepare a solution containing 20% by weight solids convertible to polyimide and having a viscosity of 5 poises compared with only 12% solids content at 5 poises for corresponding prior art material. The advantages of the higher solids content composition will be readily apparent to persons in the art.

DESCRIPTION OF THE PREFERRED EMBODIMENTS

In the compositions of this invention, the preferred component (A) of Formula 1 above is an aromatic polyamideamic acid of an aromatic tricarboxylic and a diamine, or an aromatic polyamide-acid of an aromatic tetracarboxylic acid and a diamine. In preparation, the acid mono- or dianhydride is most conveniently used. In order to provide the necessary number of amino end groups as specified in Formula 1 above, excess diamine is used.

Preferred polyamide-acids are those within the scope of above-mentioned U.S. Patent No. 3,179,614. Such polyamide-acids have the recurring formula:

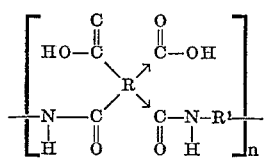

(4)

where the arrows denote isomerism and the other symbols have the same meaning as above.

As known in the art, such polyamide-acids can be prepared from aromatic tetracarboxylic acid dianhydrides and diamines. Such dianhydrides have the formula

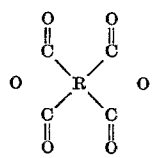

(5)

where R has the same meaning as above. Representative dianhydrides are: pyromellitic dianhydride, 3,3',4,4'-diphenyltetracarboxylic dianhydride, 1,2,5,6 - naphthalenetetracarboxylic dianhydride, 2,2',3,3' - diphenyltetracarboxylic dianhydride, 4,4'-isopropylidene-diphthalic anhydride, 4,4'-sulfonyldiphthalic anhydride, 3,4,9,10-perylenetetracarboxylic dianhydride, 4,4'-oxydiphthalic anhydride, 1,2,4,5 - naphthalenetetracarboxylic dianhydride, 1,4,5,8-naphthalenetetracarboxylicdianhydride, 2,3,6,7 - naphthalenetetracarboxylic dianhydride, 3,3'-isopropylidenediphthalic anhydride, 3.3'-ethylidene diphthalic anhydride, 4,4'-ethylidene diphthalic anhydride, 3.3'-methylene diphthalic anhydride, 4,4' - methylene diphthalic anhydride, mellophanic dianhydride, 2,3,5,6-pyrazinetetracarboxylic dianhydride, 2,3,4,5-thiophenetetracarboxylic dianhydride, 4,4'-biphthalic anhydride, 3,3'-biphthalic anhydride, 2,3,4,5-pyrrolidonetetracarboxylic dianhydride, 1,4-dimethyl-7,8 - diphenylbicyclo(2.2.2)oct - 7 - ene - 2,3,5,6 - tetracarboxylic dianhydride, 1,8-dimethyl dicyclo(2.2.2)oct-7-ene-2,3,5,6-tetracarboxylic dianhydride, 1,4,7,8-tetrachlorobicyclo(2.2.2)oct-7-ene-2,3,5,6-tetracarboxylic dianhydride, 7,8-diphenylbicyclo(2.2.2)oct-7-ene-2,3,5,6 - tetracarboxylic dianhydride, 1,8 - dimethyldicyclo(2.2.2)oct-7-ene-2,3,5,6-tetracarboxylic dianhydride, 1,2,3,4-cyclopentanetetracarboxylic dianhydride ethylenetetracarboxylic dianhydride, 3,3',4,4'-benzophenonetetracarboxylic dianhydride and its position isomers, etc.

Representative useful diamines have the formula:

(6)  $H_2N—R^1—NH_2$ where $R^1$ has the same meaning as above.

Particularly preferred diamines include: 4,4'-isopropylidene-dianiline, 4,4'-methylene-dianiline, benzidine, 3,3'- dichloro-benzidine, 4,4'-thiodianiline, 3,3'-sulfonyl-dianiline, 4,4'-sulfonyl-dianiline, 1,5-naphthalene diamine, 4,4'-(diethyl silylene)dianiline, 4,4'-(diphenyl silylene) dianiline, 4,4'-diaminobenzophenone, 4,4'-(ethylphosphinylidene)dianiline, 4,4'-(phenyl phosphinylidene)dianiline, 4,4'-(N-methylamino) dianiline, 4,4'-(N-phenylamino)dianiline and mixtures thereof, metaphenylene-diamine, paraphenylene diamine, 2,6-diaminopyridine, 4,4'-methylenedicyclohexylamine, hexamethylene diamine, heptamethylene diamine, octamethylene diamine, nonamethylene diamine, decamethylene diamine, 1,4-cyclohexane diamine. The position isomers of these compounds such as the corresponding 2,2'-diamino, 3,3'-diamino and 3,4'-diamino compounds are also useful.

When Y in Formula 1 above is based on an aromatic moiety derived from a tricarboxylic acid and a diamine, suitable starting materials useful to prepare such polymeric precursors include diamines such as recited above and a tricarboxylic monoanhydride corresponding to the tetraacids of the dianhydrides recited above, by replacing any one of the four carboxyl groups by a hydrogen atom. A highly useful compound of this type is trimellitic acid anhydride. As shown in the art, the corresponding monoanhydride acid halide such as the monoacid chloride, bromide, fluoride, etc., can be used. Other illustrative examples are 1,2,6-naphthalene tricarboxylic acid anhydride and 3,3',4-diphenyl tricarboxylic acid anhydride and their corresponding acid halides.

Useful diacid diesters are those of Formula 3 above where R can be any tetravalent organic radical such as those found in any of the representative tetracarboxylic acid dianhydrides mentioned above. The diester can readily be prepared by reaction of such tetracarboxylic acid dianhydride with a monofunctional alkanol, preferably methanol, ethanol, propanol, butanol, phenol or benzyl alcohol. Alternatively, the diester can be prepared by direct esterification of the corresponding tetracarboxylic acid.

As mentioned above, the polymeric precursor in the compositions of this invention will have from about 2 to about 60 amino end groups for each 100 recurring polymer units. The range of 5-55 is ordinarily suitable. Within this range, preferred amounts may vary for different polymers but can readily be determined by persons skilled in this art without undue experimentation. For example, when using the polyamide-acid of 3,3',4,4'-benzophenone tetracarboxylic acid dianhydride and a diamine such as methylene dianiline, in solution with the butyl half ester of 3,3',4,4'-benzophenone tetracarboxylic acid, it is preferred that such polyamide-acid have in the range of about 10–50 amino end groups for each 100 recurring polymer units. When using the polyamide-acid of pyromellitic dianhydride and a diamine such as oxydianiline, in solution with the butyl half ester of pyromellitic acid, it is preferred that such polyamide-acid have in the range of about 10–20 amino end groups for each 100 recurring polymer groups.

Also as mentioned above, the amount of diester in the compositions of this invention will ordinarily be chemically equivalent to the number of amino end groups available in the polymeric precursor. Excess amino groups of as much as 40% or 50% can be tolerated for some systems although for most systems it is preferred not to exceed 5% or 10%. Use of too much diester tends to have an adverse effect on the mechanical properties, such as the flexibility, of the final imide-containing polymer product and best results are therefore ordinarily obtained using no more than about 5 or 10% excess diester and preferably no excess at all.

Any suitable inert organic solvent can be used and many illustrative ones are disclosed in the patents referred to above. Liquids such as N,N-dimethylformamide, N,N-dimethylacetamide and N-methyl-2-pyrrolidone are preferred. Other solvents which may be used in the present invention are: N,N-diethylformamide, N,N-diethylacetamide, N,N-dimethylmethoxyacetamide, N-methylcaprolactam, dimethyl sulfoxide, N-methyl-2-pyrrolidone, tetramethyleneurea, pyridine, dimethyl sulfone, hexamethylphosphoramide, tetramethylene sulfone, formamide, N-methylformamide, butyrolactone and N-acetyl-2-pyrrolidone, ketones such as methyl ethyl ketone, nitroalkanes such as nitroethane, nitropropane, etc. The solvents can be used alone, in combinations of solvents, or in combination with poorer solvents such as benzene, benzonitrile, dioxane, xylene, toluene and cyclohexane.

The diacid diester/polymer solutions prepared in accordance with the invention are in convenient form for direct utility as an insulating varnish or preparation of high melting shaped articles requiring rigidity and high dielectric characteristics. Whatever the application or geometric shape utilized, the solution of diacid diester/polymer is conveniently converted to imide-containing polymers by heating at about 50–200° C. for about 200–10 minutes. In order to obtain the highest quality products the shaped material is heated at about 80–150° C. for about 120–30 minutes or until substantially all solvent is removed and the mixture sets up and becomes firm. This aids in reducing brittleness and cracking in the final polymer to a minimum. Thereafter the temperature is raised to about 150–500° C. for 1000–1 minutes and preferably 200–400° C. for about 500–2 minutes or until substantially all the polymer and the diacid diester are reacted, the lower temperatures being accorded the longer time.

It will be realized that the compositions of this invention may be modified by adding other monomeric or polymeric materials prior to, during or even after shaping into a desired form preparatory to heating. Materials such as epoxy resins, silicone resins, phenolic resins, polyamide resins, polyester resins, aminoplast resins, polybenzimidazoles, polyimides and precursors thereof, polytetrafluoroethylene and copolymers, polyphenylene oxides, polyoxadiazoles, polyvinylformal acetal or butyral resins, polyurethanes, and the like, can be included. In some instances as much as 50% or more modifying material can be added. Also, of course, inert materials such as pigments, dyes, organic and inorganic fillers may be added prior to, during or subsequent to shaping.

The invention will be more clearly understood by referring to the examples which follow. All parts are by weight unless otherwise indicated.

EXAMPLE 1

A solution A of butyl half ester of 3,3′,4,4′-benzophenonetetracarboxylic acid dianhydride (BTDA) was prepared from 644 grams of BTDA, 326 grams of butanol and 318 grams of N-methylpyrrolidone (NMP) by heating these ingredients together in a 2 liter flask with stirring for one hour at 100–110° C.

A solution B was prepared by adding in order 825 grams of NMP, 118.4 grams of methylene dianiline (MDA), and 173.9 grams of BTDA.

38.6 grams of solution A was added to solution B. The resulting solution AB had a solids equivalent to 27% polyamic acid and had a viscosity of 15 poises.

A solution C was prepared by adding in order 804 grams of NMP, 118.4 grams of MDA, 154.6 grams of BTDA and 77.2 grams of solution A. Solution C had a solids equivalent to 27% polyamic acid and had a viscosity of 5 poises.

Solutions AB and C were coated on wire and baked in a wire coating tower in a conventional manner and found to have acceptable coating properties at speeds of 40 feet per minute.

EXAMPLE 2

A solution was prepared by adding in order 536.92 grams of NMP, 139.06 grams of aromatic hydrocarbon solvent (B.P. 150–190° C.), 120.07 grams of oxydianiline (ODA), 117.78 grams of pyromellitic dianhydride (PMDA) and 38.64 grams of the butyl half ester solution A of Example 1. The solution had a viscosity of 87 poises at 27% solids and was reduced to 15 poises at 22% solids with an NMP/aromatic hydrocarbon solvent 80/20 mixture. No. 18 gauge copper wire was coated and baked as in Example 1 to yield a satisfactory blister-free product at coating speeds up to 35 feet per minute.

EXAMPLE 3

A solution of the ethyl half ester of PMDA was prepared by heating 771.4 grams of NMP, 101.0 grams of ethanol, and 218.1 grams of PMDA, at 98–100° C. until the 5.4 and 5.6 micron peaks in the infrared curve disappear.

A wire enamel was then prepared by mixing 1029.21 grams of NMP, 266.07 grams of aromatic hydrocarbon solvent, 170.1 of ODA, 176.12 grams of PMDA and 37.05 grams of the above ethyl half ester solution. The solids were 21.3% and the viscosity 50 poises.

The above wire enamel was coated and baked as in Example 1 on No. 18 wire at speeds of up to 40 feet per minute without blistering. Flexibility of the coated wire was excellent.

EXAMPLE 4

A solution of off-stoichiometry polyamic acid without any half ester was prepared by mixing the following in order: 1059.64 grams of NMP, 264.89 grams of aromatic hydrocarbon solvent, 160.10 grams of ODA and 166.65 grams of PMDA. Wire was coated with this solution and the resulting polyimide was found to be deficient in flexibility when compared to the polyimide prepared from the same polyamic acid with sufficient half ethyl ester of PMDA added to bring the resulting polyimide to essentially stoichiometric proportions. No. 18 heavy build copper magnet wire coated with the off-stoichiometry polyamic acid was rapidly elongated to break it. It could then be wrapped on a mandrel no smaller than four times the original wire diameter without cracking the enamel. The same type of off-stoichiometry polyamic acid when modified with half ester to bring the polyimide to essentially stoichiometric proportions was used to produce wire which could be wrapped on a mandrel as small as the original wire diameter without cracking when tested as above. The corresponding stoichiometric polyamic acid could also be used to produce wire which could be wrapped on a mandrel equal to the original wire diameter without cracking when tested as above.

The foregoing examples can be repeated, as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. A composition comprising, in an inert organic solvent, a linear aromatic polymeric precursor of an imide-containing polymer selected from the group consisting of a polyamide-acid, a polyamide ester, and a polyamide-amic acid, said precursor having from about 2 to about 60 amino end groups for each 100 recurring polymer units, and a monomeric aromatic diacid diester, of the formula

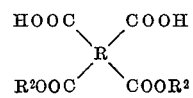

where R is a tetravalent aromatic radical containing at least six carbon atoms, no more than two carbonyl groups of said diester being attached to any one carbon atom of R and R² is alkyl, aryl or aralkyl.

2. A composition as in claim 1, wherein said precursor is a polyamide-acid having the formula

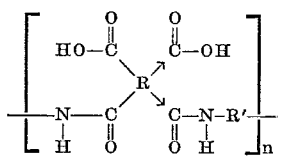

wherein → denotes isomerism; wherein R is a tetravalent organic radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of said adjacent polyamide-acid units each attached to separate carbon atoms of said divalent radical; and wherein n is an integer sufficient to provide an inherent viscosity of at least 0.1.

3. A composition as in claim 2 wherein said precursor is a soluble, flexible polyamide resin that is the polymeric condensation product of an aromatic primary diamine containing from 6 to 16 carbon atoms with the dianhydride of an acid selected from the group consisting of 2,2',3,3'-, 2,3,3',4'-, 3,3',4,4'-benzophenonetetracarboxylic acids and mixtures thereof.

4. A composition as in claim 1 wherein said precursor is a high molecular weight solid polymer of an aromatic primary diamine and an acyl halide derivative of trimellitic anhydride which contains at least one acyl halide group and that in the 4-ring position, said polymer having film-forming properties and an inherent viscosity when dissolved in N,N-dimethylacetamide of at least about 0.2.

5. A composition as in claim 2 wherein said precursor is the polyamide-acid of pyromellitic dianhydride and an aromatic diamine and said diester is the dialkyl half ester of pyromellitic acid, each of said alkyl groups containing 1–4 carbon atoms.

6. A composition as in claim 5 wherein said diamine is oxydianiline and said diester is the ethyl half ester of pyromellitic acid.

7. A composition as in claim 3 wherein said precursor is the polyamide-acid of benzophenonetetracarboxylic acid dianhydride and an aromatic diamine and said diester is the dialkyl half ester of benzophenonetetracarboxylic acid, each of said alkyl groups containing 1–4 carbon atoms.

8. A composition as in claim 7 wherein said diamine is methylene dianiline and said diester is the butyl half ester of benzophenonetetracarboxylic acid.

9. A composition as in claim 2 wherein said precursor is the polyamide-acid of pyromellitic dianhydride and an aromatic diamine and said diester is the dialkyl half ester of benzophenonetetracarboxylic acid, each of said alkyl groups containing 1–4 carbon atoms.

10. A composition as in claim 9 wherein said diamine is oxydianiline and said diester is the butyl half ester of benzophenonetetracarboxylic acid.

References Cited
UNITED STATES PATENTS

| | | | |
|---|---|---|---|
| 3,190,856 | 6/1965 | Lavin et al. | 260—65 |
| 3,242,128 | 3/1966 | Chalmers | 260—32.6 |
| 3,260,691 | 7/1966 | Lavin et al. | 260—30.2 |
| 3,347,808 | 10/1967 | Lavin et al. | 260—29.1 |

WILLIAM H. SHORT, Primary Examiner

L. L. LEE, Assistant Examiner

U.S. Cl. X.R.

260—30, 32, 65, 78